Aug. 25, 1953

J. FLAWS, JR 2,649,655

DISPENSING DEVICE

Filed Sept. 24, 1949

INVENTOR.
JOHN FLAWS, JR.
BY
ATTORNEY.

Aug. 25, 1953  J. FLAWS, JR  2,649,655
DISPENSING DEVICE
Filed Sept. 24, 1949  2 Sheets-Sheet 2

INVENTOR.
JOHN FLAWS, JR.
BY
ATTORNEY.

Patented Aug. 25, 1953

2,649,655

UNITED STATES PATENT OFFICE 2,649,655

DISPENSING DEVICE

John Flaws, Jr., East Cleveland, Ohio

Application September 24, 1949, Serial No. 117,686

10 Claims. (Cl. 30—127)

This invention relates to dispensing devices and more particularly to a new and improved device for dispensing predetermined lengths of a cord-like or strand material as it is drawn from a spool or reel upon which it may be wound.

The device herein contemplated is particularly adapted for the dispensing of materials such as dental floss where it is highly desirable that the material be maintained in a sanitary depository at all times and that only the immediate portion to be used be subject to handling. Heretofore, in using strand material such as dental floss it has been customary for the user to manually unwind a portion or length of the material and then cut the same. In so doing the user was prone to handle the spool or reel of material as the case might have been, thereby subjecting the material to unsanitary conditions. Where the material was housed within a container and withdrawn therefrom through a small opening in the cover of the container the material was not readily available at the opportune moment and necessitated interruption in the work at hand. The dispensing device of the present invention overcomes the drawbacks and undesirable features of the foregoing prior practices.

It is among the objects of the present invention to provide a device which is particularly adapted to dispense predetermined lengths of a strand material in a sterile and hygienic condition.

It is a further object of the invention to provide a device for dispensing dental floss wherein the end of the floss is first projected out of the container, manually gripped and withdrawn from the device to a predetermined length and then automatically severed upon the withdrawal of the predetermined length, with the free end of the floss retained within the confines of the device.

A still further object of the invention is to provide a device for dispensing dental floss which is simple in operation, economical to manufacture and may be disposed in positions easily and readily accessible to users of the floss.

Other objects and advantages of the invention, not at this time more particularly enumerated, will become more apparent as the nature of the invention is better understood from the following detailed description taken in conjunction with the accompanying drawings, wherein similar reference characters denote corresponding parts and wherein.

Figure 4:
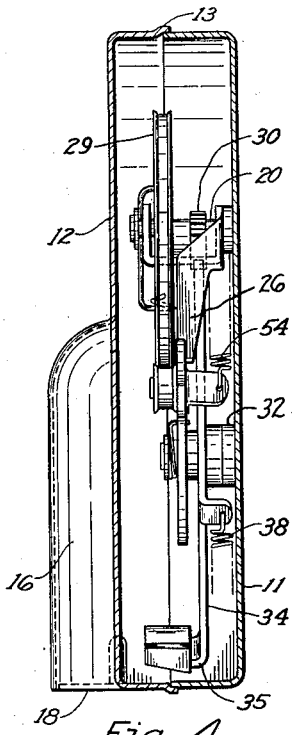
Figure 4 is a front elevational view with the front wall of the device cut away.
Figure 5:
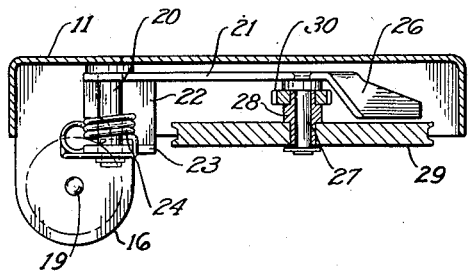
Figure 5 is a horizontal sectional view taken on the line 5—5 of Figure 2.
Figure 6:
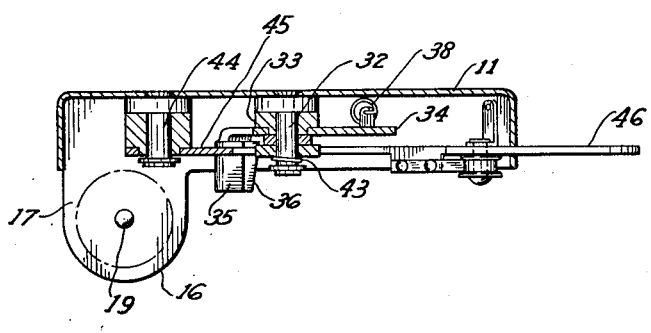
Figure 6 is a horizontal sectional view taken on the line 6—6 of Figure 2.

With reference to the accompanying drawings there is disclosed a dental floss dispensing device constructed in accordance with the invention and comprising a case or housing 10 having two mating cup-shaped members 11 and 12. The housing 10 may take any desirable exterior shape suitable for housing the mechanism of the device and is arranged to be secured to a wall or suitable equipment for handy and convenient use. The peripheral edge of the housing member 12 is offset outwardly as at 13 (see Figure 4) to telescopically receive the peripheral edge of the member 11 and hold the members in assembled relation. The front edge portion of the member 11 is cut away to form an elongated slot 14 through which the operating lever of the device extends as will be described hereinafter. Spaced below the slot 14 there is provided an opening 15 in the wall of the member 11 through which the material contained in the device is adapted to pass. The wall of the cup-shaped member 12 adjacent its rearward edge is formed with a semicylindrical enlargement 16 which serves to define a cavity 17 within the housing 10. The side wall portion of member 11 is extended outwardly to provide a closure or bottom 18 for the cavity 17. Projecting upwardly from the bottom 18 of the cavity 17 is a spindle 19 which is adapted to receive thereon a spool or reel of dental floss or other material "A" suitable for dispensing in the device.

Secured to the inner surface of the wall of the member 11 and projecting inwardly therefrom is a shaft 20. Mounted for oscillatory movement on the shaft 20 is an arm 21 having a portion 22 extending parallel to shaft 20 and terminating in an upturned flange 23 which is suitably apertured to receive the shaft 20 thereby providing a rigid pivotal support for the arm 21. Encircling the shaft 20 between the flange 23 and arm 21 is a plurality of convolutions of a spring member 24 adapted to receive the strand material "A" and effect a tensioning thereof as it is drawn from the spool. One end of the spring 24 is extended downwardly and formed with an eyelet 25 which is positioned between the spool of material "A" and spring member 24 for guiding the strand material therebetween. The free end of the arm 21 projects forwardly and the outer end is twisted through an angle of approximately ninety degrees to form an abutment portion 26 which is inclined downwardly out of the plane of the arm 21. The arm 21 supports a shaft 27 having rotatably mounted thereon a bearing sleeve 28. The sleeve 28 carries at one end thereof a sheave 29 and at the other end a pinion 30 and the two elements are adapted to rotate as a unit upon the shaft 27.

Secured to the inner surface of the wall of the member 11 and projecting inwardly therefrom is a shaft 32 upon which is rotatably mounted a hub 33 carrying thereon an angulated member or arm 34. The upper edge surface of the member 34 is formed with a rack 31 which operatively engages the pinion 30 to effect an oscillating movement to the arm 34. The opposite end of the arm 34 is tapered and terminates in an outwardly turned flange 35 which is folded over to clamp thereon a knife blade 36. Upon oscillating movement of the arm 34 the blade 36 is caused to swing across the opening 15. Extending between the side wall of the member 11 and the arm 34 is a spring 38 which normally urges the arm 34 to rotate in a clockwise direction to clear the knife edge from the opening 15. Mounted on the shaft 32 is a latching member 40 one end of which serves as a follower 41 and the opposed end thereof is adapted to engage a stop 42 carried by the arm 34. A spring member 43 extending from the stop 42 encircling the shaft 32 and terminating adjacent the outer end of the follower 41 serves to urge the latch member 40 to move in a clockwise direction.

Positioned below the shaft 20 and projecting inwardly from the wall of the member 11 is a pin 44. Pivoted on the pin 44 is a lever arm 45 which is angularly shaped to pass below the latch member 40 and terminate in a handle portion 46 which projects outwardly through the opening 14 in the case 10. On the upper surface of the arm 45 there is provided a cam surface 50 engageable by the follower 41 as illustrated in Figure 2 of the drawings. The upper surface of the arm 45 is provided with a lug 51 to which is secured a spring element 52 the outer free end being bent downwardly and engageable with a stop element 53 carried on the outer portion of the arm 45 adjacent the wall of the case. The spring element 52 and stop 53 are adapted to grip therebetween the strand of dental floss "A" and to move the same therewith upon downward movement of the handle 46. A spring 54 extending from the arm 45 to the side wall of the case 10 normally urges the arm upwardly and returns the lever arm to the position shown in Figure 1 after it has been manually depressed into the position shown in Figure 2. A pig-tail guide 55 is secured to the side walls of the case 10 between the openings 14 and 15 and serves to guide the material though the opening 15 upon downward movement of the handle 46.

Figure 1:
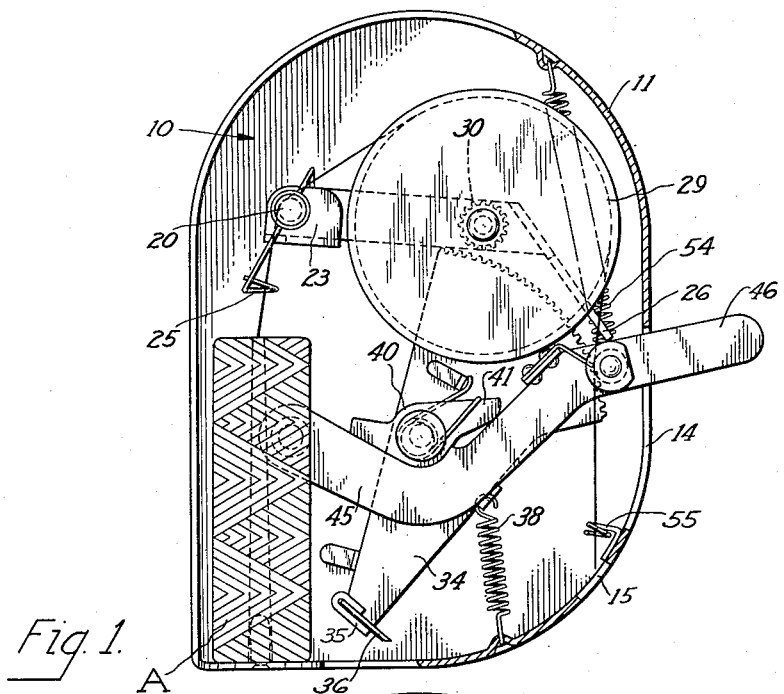
Figure 1 is a side elevational view of a dispensing device with one portion of the housing removed and illustrating the pertinent elements of the device in their relative location at the beginning of the cycle of operation.
Figure 2:
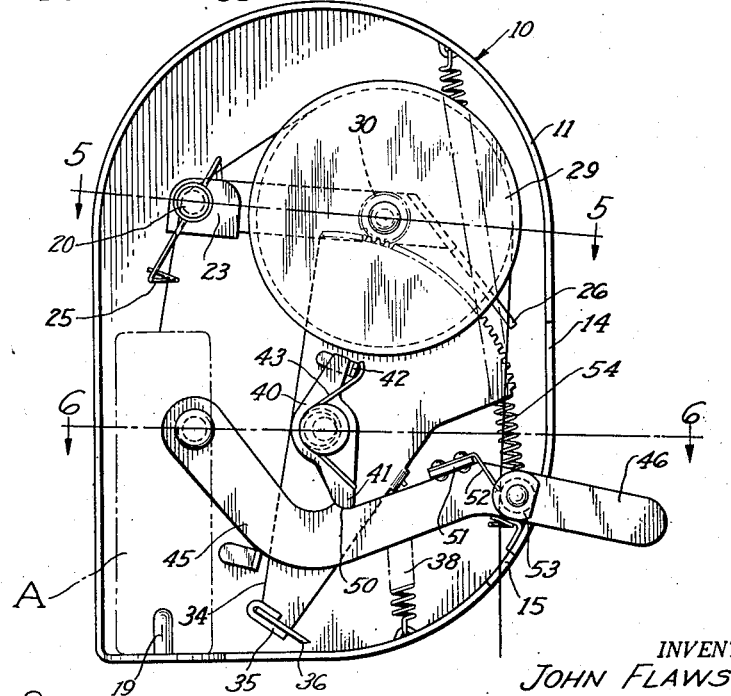
Figure 2 is a view similar to Figure 1 illustrating the elements of the device at the end of the first stage of operation.
Figure 3:
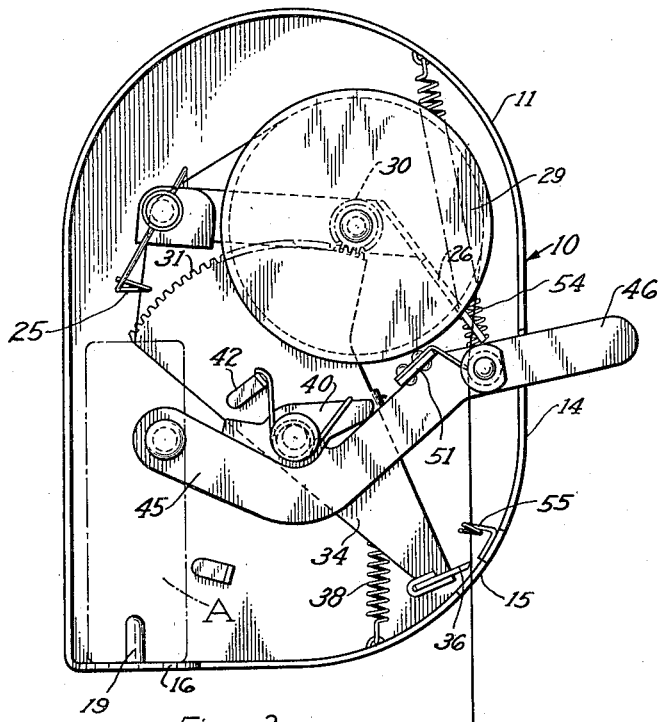
Figure 3 is a view similar to Figure 1 illustrating the operating elements of the device at the end of the second stage of operation and at the point of serving of the material.

In operation the strand of material "A" is drawn from the spool or reel upon which it is wound upwardly through the eyelet 25, and thence between the convolutions of spring member 24 a turn and a half around the sheave 29, between gripping members 52 and 53, through eyelet 55 and into alignment with opening 15 as viewed in Figure 1. To dispense a length of material the user depresses handle 46, the strand of material which is gripped between elements 52 and 53 on the lever is projected outwardly through the opening 15 a distance sufficient to be grasped by the user. At the end of the downward stroke of the handle 46 the follower 41 of latch 40 drops into locking position behind cam element 50 to retain lever 45 in its lowermost position as shown in Figure 2. The downward movement of material "A" by the handle 46 places the material under tension causing the arm 21 to pivot and move pinion 30 into engagement with the rack 35. The user then grasps the end of the material projecting from the case 10 and pulls downwardly thereon. The drawing of the material rotates sheave 29 and in turn pinion 30 connected thereto which is in engagement with rack 35 on lever arm 34, moves the latter about its pivot point in a counter-clockwise direction as viewed in Figures 2 and 3, and moves the knife edge across the path of travel of the material "A" adjacent the opening 15 severing the same at this point. As the lever arm 34 is rotated counter-clockwise the stop 42 is moved therewith causing the latch member 40 to rotate counter-clockwise thereby releasing follower 41 from cam element 50 and permitting the lever arm 45 to be returned to its initial position by spring 54. The device is then in position to repeat its cycle of operation.

Having thus described my invention so that those skilled in the art may practice the same, what I desire to obtain by Letters Patent is defined in the appended claims.

I claim:

1. A dispensing device of the class described comprising a hollow housing adapted to contain a supply of cord-like material, material cutting means pivotally mounted within said housing, said means being arranged to traverse the path of travel of material within the housing adjacent to point of discharge therefrom, manually actuated means for moving the material to an accessible position exteriorly of the housing, and means responsive to the withdrawal of the material from the housing for moving said cutting means and severing the material.

2. A dispensing device of the class described comprising a hollow housing adapted to contain a supply of cord-like material, manually actuated means for moving the material through said housing to an accessible position exteriorly of the housing, an oscillating arm pivotally mounted within the housing and carrying a knife edge arranged to traverse the path of travel of the material within the housing, and means responsive to the manual withdrawal of the material from the housing for moving said oscillating arm and causing the knife carried thereby to sever the material.

3. A dispensing device of the class described comprising a hollow housing adapted to contain a supply of cord-like material, manually actuated means for moving the material to an accessible position exteriorly of the housing, material cutting means mounted within said housing, said material cutting means including an oscillating arm carrying a knife edge on one end and formed with a rack on the opposed end, and means responsive to movement of the material and engageable with the rack for moving said knife edge transversely of the path of travel of the material and severing the same.

4. A dispensing device of the class described comprising a hollow housing adapted to contain a supply of cord-like material, manually actuated means for moving the material to an accessible position exteriorly of the housing, a latch member engageable with said means for securing same upon movement of the material to said position, an oscillating arm pivotally mounted within the housing and carrying a knife edge arranged to traverse the path of travel of the material within the housing, and means responsive to the manual withdrawal of the material from the housing for moving said oscillating arm and causing the knife carried thereby to sever the material, said oscillating arm being arranged to release the latch member upon being moved to material cutting position.

5. A dispensing device of the class described comprising a hollow housing adapted to contain a supply of cord-like material, manually actuated means for moving the material to an accessible position exteriorly of the housing, an oscillating arm pivotally mounted within the housing and carrying a knife edge arranged to traverse the path of travel of the material within the housing, and means for moving said oscillating arm and causing the knife carried thereby to sever the material, said means including a sheave about which the material is adapted to be drawn and arranged to engage the said oscillating arm when material is manually withdrawn from the housing.

6. A dispensing device of the class described comprising a hollow housing adapted to contain a supply of cord-like material, manually actuated means adapted to grip the material and move same to an accessible position exteriorly of the housing, an oscillating arm pivotally mounted within the housing carrying a knife edge arranged to traverse the path of travel of the material within the housing, a rack formed on said arm, and means for moving said oscillating arm and causing the knife carried thereby to sever the material, said last named means including a pinion adapted to engage said rack upon manual withdrawal of the material from the housing.

7. A dispensing device of the class described comprising a hollow housing adapted to contain a supply of cord-like material, material gripping means, a handle projecting exteriorly of said housing for actuating said gripping means to project the end of the material exteriorly of the housing, an oscillating arm pivotally mounted within the housing formed with a knife edge on one end and an arcuate rack on the other, and means for oscillating said arm, said means including a sheave about which the material is passed, a pinion movable with said sheave, and adapted to be moved into engagement with said rack upon downward movement of the material gripping means.

8. A dispensing device of the class described comprising a hollow housing adapted to contain a supply of cord-like material, material gripping means, a handle projecting exteriorly of said housing for actuating said gripping means to project the end of the material exteriorly of the housing, an oscillating arm pivotally mounted within the housing formed with a knife edge on one end and an arcuate rack on the other, means for oscillating said arm, said means including a sheave about which the material is passed, a pinion movable with said sheave, and adapted to be moved into engagement with said rack upon downward movement of the material gripping means, whereupon further withdrawal of the material from the housing rotates the pinion which in turn moves the arm about its pivot and causes the knife edge to traverse the path of travel of the material and sever the same, and means for returning said arm and material gripping means to their initial positions.

9. A dispensing device of the class described comprising a hollow housing adapted to contain a supply of cord-like material, material gripping means, a handle projecting exteriorly of said housing adapted to be depressed for actuating said gripping means to project the end of the material exteriorly of the housing, a latch member mounted within the housing arranged to secure the handle in its depressed position, an oscillating arm pivotally mounted within the housing formed with a knife edge on one end and an arcuate rack on the other, and means for oscillating said arm including a sheave about which the material is passed, a pinion movable with said sheave, and adapted to be moved into engagement with said rack upon downward movement of the material gripping means, said means adapted to be actuated upon manual withdrawal of the material from the housing to cause the knife edge to traverse the path of travel of the material and sever the same.

10. A dispensing device of the class described comprising a hollow housing adapted to contain a supply of cord-like material, material gripping means, a handle projecting exteriorly of said housing adapted to be depressed to actuate said gripping means to project the end of the material exteriorly of the housing, a latch member mounted within the housing and arranged to secure the handle in its depressed position, an oscillating arm pivotally mounted within the housing formed with a knife edge on one end and an arcuate rack on the other, and means including a pinion adapted to engage said rack and be moved by the manual withdrawal of the material from the housing for causing the knife to traverse the path of travel of the material and sever the same, said latch member being released upon movement of the arm permitting the material gripping means to return to its initial position and the disengagement of the pinion from the rack and the return of the arm to its initial position.

JOHN FLAWS, Jr.

References Cited in the file of this patent

UNITED STATES PATENTS

| Number | Name | Date |
|---|---|---|
| 407,567 | Bauer | July 23, 1889 |
| 548,519 | Coffield | Oct. 22, 1895 |
| 554,688 | Heck | Feb. 18, 1896 |
| 1,462,097 | Yamada | July 17, 1923 |
| 1,993,951 | Ashe | Mar. 12, 1935 |